(12) United States Patent
Sakura et al.

(10) Patent No.: US 8,549,427 B2
(45) Date of Patent: Oct. 1, 2013

(54) ARTICLE PRODUCING TERMINAL APPARATUS, ARTICLE PRODUCING METHOD AND PROGRAM

(75) Inventors: Kohei Sakura, Kanagawa (JP); Toshiyuki Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 11/686,585

(22) Filed: Mar. 15, 2007

(65) Prior Publication Data

US 2008/0141169 A1 Jun. 12, 2008

(30) Foreign Application Priority Data

Mar. 16, 2006 (JP) ................ P2006-072915

(51) Int. Cl.
*G06F 3/048* (2013.01)
(52) U.S. Cl.
USPC .......... 715/810; 715/762; 715/737; 358/1.15; 358/402; 358/487; 358/434; 709/205; 709/216
(58) Field of Classification Search
USPC ............... 715/810, 762; 358/1.15, 402, 302, 358/487; 709/219, 216, 205
See application file for complete search history.

(56) References Cited

U.S. PATENT DOCUMENTS

| | | | | |
|---|---|---|---|---|
| 5,978,560 | A * | 11/1999 | Tan et al. | 358/1.15 |
| 6,373,585 | B1 * | 4/2002 | Mastie et al. | 358/1.15 |
| 6,529,286 | B1 * | 3/2003 | King | 358/1.14 |
| 2001/0049640 | A1 * | 12/2001 | Kurokawa et al. | 705/26 |
| 2002/0093680 | A1 * | 7/2002 | Tanaka | 358/1.15 |
| 2002/0093681 | A1 * | 7/2002 | Hitaka | 358/1.15 |
| 2003/0184799 | A1 * | 10/2003 | Ferlitsch | 358/1.15 |
| 2004/0027608 | A1 | 2/2004 | Kinjo | |
| 2004/0083276 | A1 * | 4/2004 | Shiraga | 709/219 |
| 2005/0005061 | A1 * | 1/2005 | Robins | 711/104 |
| 2005/0219606 | A1 | 10/2005 | Tanaka | |
| 2005/0265766 | A1 * | 12/2005 | Ohmura | 400/62 |
| 2006/0268357 | A1 * | 11/2006 | Vook et al. | 358/448 |

(Continued)

FOREIGN PATENT DOCUMENTS

| | | | |
|---|---|---|---|
| EP | 1333655 | * | 1/2003 |
| EP | 1333655 | | 8/2003 |

(Continued)

OTHER PUBLICATIONS

Nokia Siemens Networks; QoS-enabled IP networks Insights into ResIP findings; Copyright 2010; 12 pages.*

(Continued)

*Primary Examiner* — Linh K Pham
(74) *Attorney, Agent, or Firm* — Dentons US LLP

(57) ABSTRACT

An article producing terminal apparatus communicatable with an external apparatus holding article-producing job data including image data, production information for producing an article using the image data and terminal designation information is disclosed. The apparatus includes: a communication unit communicating with the external apparatus; an article producing unit producing an article using the image data; a job acquiring unit acquiring that article-producing job data in the article-producing job data held in the external apparatus which designates the local article producing terminal apparatus with the terminal designation information by causing the communication unit to communicate with the external apparatus; and a job execution control unit causing the article producing unit to execute article production based on the image data and the production information in the article-producing job data acquired by the job acquiring unit.

4 Claims, 10 Drawing Sheets

(56) References Cited

U.S. PATENT DOCUMENTS

| | | | |
|---|---|---|---|
| 2007/0035763 A1* | 2/2007 | Bard et al. | 358/1.15 |
| 2007/0113164 A1* | 5/2007 | Hansen et al. | 715/500 |
| 2007/0247661 A1* | 10/2007 | Minami et al. | 358/1.15 |
| 2007/0253020 A1* | 11/2007 | Hull et al. | 358/1.15 |

FOREIGN PATENT DOCUMENTS

| | | | |
|---|---|---|---|
| JP | 2000-177212 | | 6/2000 |
| JP | 2001-109592 | * | 4/2001 |
| JP | 2002049797 A | * | 2/2002 |
| JP | 2002-359709 | | 12/2002 |
| JP | 2003-044236 | | 2/2003 |
| JP | 2004320277 A | * | 4/2003 |
| JP | 2003-216357 | | 7/2003 |
| JP | 2004038249 A | * | 2/2004 |
| JP | 2005-343140 | | 12/2005 |
| JP | 2005-352882 | | 12/2005 |
| JP | 2006-004064 | | 1/2006 |
| JP | 2006-004323 | | 1/2006 |
| WO | 01/01669 | | 1/2001 |
| WO | WO 02061511 | * | 8/2002 |

OTHER PUBLICATIONS

EP Communication dated Jul. 18, 2008 for Application No. 07005297.2- 2202/1835712.

Japanese Office Action issued on Aug. 5, 2009 in connection with JP Application No. 2006-072915.

Japanese Office Action issued on Feb. 9, 2010 in connection with corresponding JP Application No. 2006-072915.

* cited by examiner

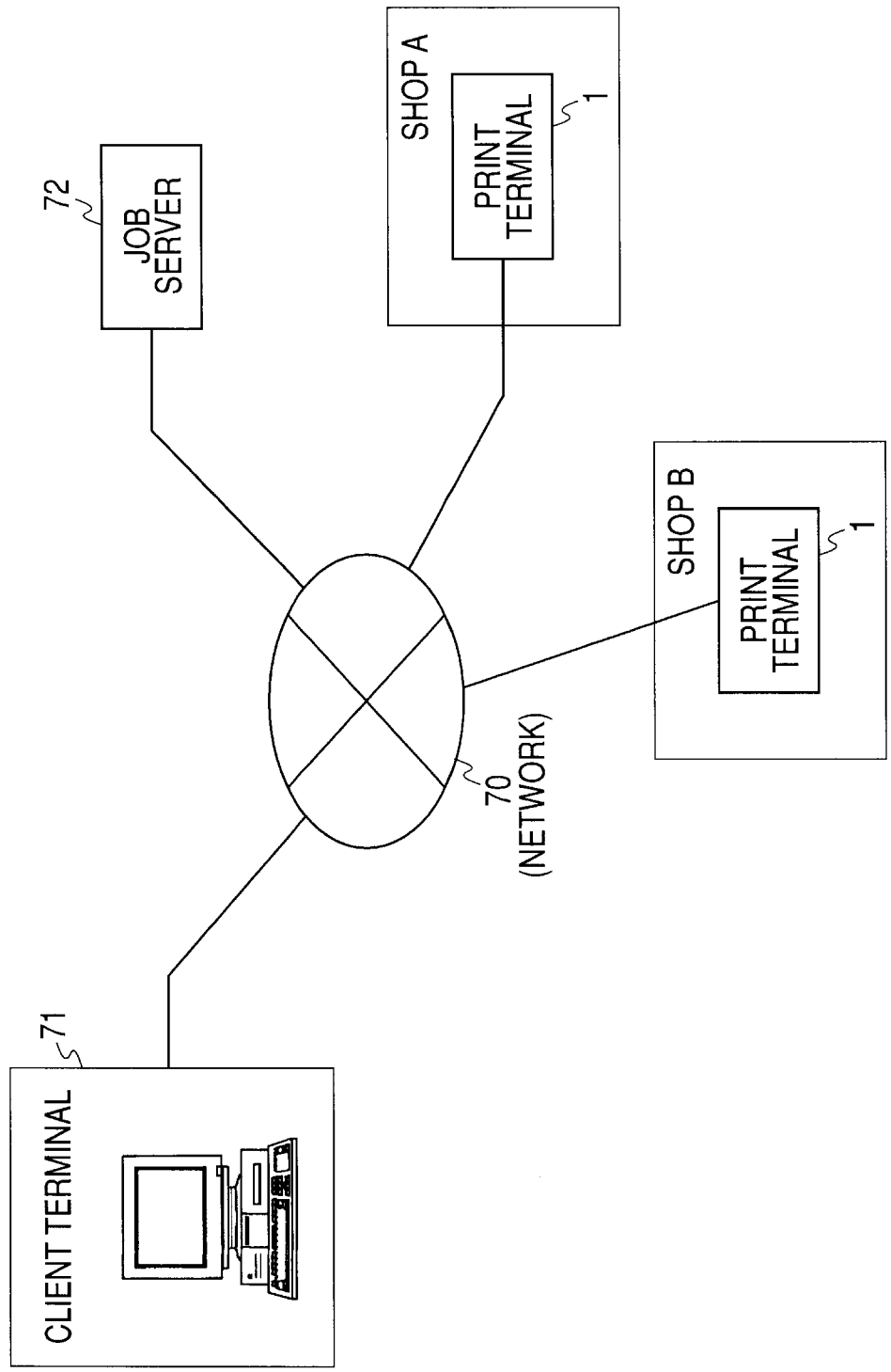

FIG. 4A

JOB DATA BASE

| JOB ORDER NUMBER | TERMINAL DESIGNATION INFORMATION | CLIENT TERMINAL INFORMATION | PRINT PRODUCING INFORMATION | IMAGE DATA | DOWNLOAD PROGRESS INFORMATION |
|---|---|---|---|---|---|
| SA001 | TD1 | UT1 | ------- | PCT PCT ... | DLP |
| SA002 | TD2 | UT3 | ------- | PCT | DLP |
| SA003 | TD1 | UT3 | ------- | PCT PCT ... | DLP |
| ... | ... | ... | ... | ... | ... |

DOWNLOAD

FIG. 4B 13 (STORAGE UNIT)

DOWNLOAD JOB STORAGE SECTION

| JOB ORDER NUMBER | CLIENT TERMINAL INFORMATION | PRINT PRODUCING INFORMATION | IMAGE DATA | ESTIMATED PROCESS TIME |
|---|---|---|---|---|
| SA001 | UT1 | ------- | PCT PCT ... | 00:05:00 |
| SA003 | UT3 | ------- | PCT PCT ... | 00:07:00 |

ARTICLE PRODUCING TERMINAL APPARATUS, ARTICLE PRODUCING METHOD AND PROGRAM

CROSS REFERENCES TO RELATED APPLICATIONS

The present invention contains subject matter related to Japanese Patent Application JP 2006-072915 filed in the Japanese Patent Office on Mar. 16, 2006, the entire contents of which being incorporated herein by reference.

BACKGROUND OF THE INVENTION

1. Field of the Invention

The present invention relates to an article producing terminal apparatus, an article producing method, and a program, which produces an article using image data and are suitable for use in a print service or the like which produces, as an article, a photograph image having, for example, image data printed.

2. Description of the Related Art

[Patent reference 1] JP-A-2001-109592
[Patent reference 2] JP-A-2002-359709

There are self-service type print terminal apparatuses (also called "kiosk terminals") which are placed in shops, such as a photograph service shop and a convenience store, and allow a user (customer) to operate each apparatus to print out images or the like picked up with a digital still camera.

Specifically, a customer carries a recording medium having picked-up image data recorded therein into a shop and loads the recording medium into a print terminal apparatus. One of available recording media is a memory card known as "MEMORY STICK (Registered Trademark of Sony Corporation)".

The print terminal apparatus is provided with a slot for a memory card. As a customer loads a memory card into the slot, the print terminal apparatus reads and displays image data stored in the memory card. The customer performs an operation to select an image to be printed from the displayed images or set the number of prints, the size thereof and so forth. In accordance with the customer's operation, the print terminal apparatus accepts the order and does the designated printing. The customer can receive printed photographs on the premise.

SUMMARY OF THE INVENTION

As digital still cameras are becoming very popular recently, many people take a lot of pictures, resulting in an increasing demand for the use of the print terminal apparatus. In addition, the number of prints per user tends to increase. Accordingly, the opportunity of using such a print terminal apparatus in a shop or so is increasing too.

While such a print service is convenient to use, there are increasing cases where customers feel inconvenient in using the print service due to various circumstances, such as the print performance (print time needed) of each print terminal apparatus, the number of print terminal apparatuses sited in a shop or the like, the number of shops having print terminal apparatuses sited therein, and the locations thereof in shops. For example, a customer carrying image data in a memory card into a shop may wait for a long time to use the print service if another customer is using a print terminal apparatus.

From the viewpoint of the performance of the print terminal apparatus in such a case, when lots of customers are intensively using the print terminal apparatus, the print terminal apparatus cannot properly deal with orders due to the time required for each printing process, whereas there are inactive or quiet time zones where there are no orders to execute. This means that the print terminal apparatus is not working effectively.

There are variations in the operating rate among print terminal apparatuses sited at various locations. For example, many customers intensively use a print terminal apparatus sited at one location while few customers use a print terminal apparatus sited at another location.

It is therefore desirable to realize efficient activation of an article producing terminal apparatus site in, for example, a shop or the like.

An article producing terminal apparatus according to an embodiment of the present invention is communicatable with an external apparatus holding article-producing job data including image data, production information for producing an article using image data and terminal designation information. The article producing terminal apparatus includes a communication unit communicating with the external apparatus; an article producing unit producing an article using image data; a job acquiring unit acquiring that article-producing job data in the article-producing job data held in the external apparatus which designates the local article producing terminal apparatus with the terminal designation information by causing the communication unit to communicate with the external apparatus; and a job execution control unit causing the article producing unit to execute article production based on the image data and the production information in the article-producing job data acquired by the job acquiring unit.

For example, the article producing unit is a printing unit which prints image data, and produces a print image as an article using the image data.

The article producing terminal apparatus further includes a display unit, and an operation input unit, and the job execution control unit displays a list of article-producing job data acquired by the job acquiring unit, and causes the article producing unit to execute article production for the selected article-producing job data according to an operational input from the operation input unit.

In this case, particularly, the job execution control unit displays an estimated time needed for article production for each article-producing job data at a time of displaying the list of article-producing job data.

When article production for a piece of article-producing job data in the article producing unit is completed, the job execution control unit transmits a notice of completion to the external apparatus via the communication unit.

An article producing method according to an embodiment of the present invention is for an article producing terminal apparatus communicatable with an external apparatus holding article-producing job data including image data, production information for producing an article using image data and terminal designation information. The article producing method includes a job acquiring step of communicating with the external apparatus, and acquiring that article-producing job data in the article producing job data held in the external apparatus which designates the local article producing terminal apparatus with the terminal designation information by causing the communication unit to communicate with the external apparatus; and a job execution step of executing article production based on the image data and the production information in the article-producing job data acquired in the job acquiring step.

A program according to an embodiment of the present invention allows an article producing terminal apparatus to execute the article producing method.

According to the embodiments of the present invention, the article producing terminal apparatus causes the job acquiring unit to acquire article-producing job data designated as job data that is executed by the local article producing terminal apparatus from an external apparatus.

Article-producing job data is data per order, which includes image data and production information for producing an article using the image data. When a client orders a print image of image data, for example, the article-producing job data includes one piece of or plural pieces of image data and production information for generating a print image, namely, information on the number of prints and the size thereof. The article-producing job data also includes terminal designation information which designates an article producing terminal apparatus to execute article production.

An "external apparatus" is an apparatus which holds article-producing job data as, for example, a client's order, and may be an exclusive server apparatus or a client's personal terminal apparatus (e.g., a personal computer owned by a client). Further, to one article producing terminal apparatus, another article producing terminal apparatus may be the external apparatus.

When the job acquiring unit acquires article-producing job data designated by terminal designation information by the local article producing terminal apparatus, the job execution control unit executes and controls an article production process based on the article-producing job data. For example, the job execution control unit displays a list of acquired article-producing job data and executes an article production process (e.g., printing) based on the article-producing job data selected according to the client's operation.

The article producing terminal apparatus according to the embodiment of the present invention is an apparatus to which a client provides image data or performs setting and which produces an article (commodity) using the image data, and includes, for example, an apparatus which records image data on an optical disk of a CD (Compact Disc) type or DVD (Digital Versatile Disc) type and provides a client with the optical disk besides a print terminal apparatus which prints image data.

According to the embodiments of the present invention, the article producing terminal apparatus access an external apparatus to search for article-producing job data. Particularly, the article producing terminal apparatus searches for, and acquires, article-producing job data which designates the article producing terminal apparatus as a terminal which is to execute the job. After fetching the article-producing job data, the article producing terminal apparatus displays, for example, a list of article-producing job data, and executes a job according to a client's operation, i.e., an article production process based on the article-producing job data selected from the displayed list. When the article producing terminal apparatus is a print terminal apparatus, for example, the apparatus executes image printing.

Such an article producing terminal apparatus can collect orders destined to the article producing terminal apparatus, and can execute an operation according to an order made by an operation by a clerk or the like, for example, in an inactive time zone where there are few customers or after closing the shop. That is, the article producing terminal apparatus can flexibly cope with an order (job to be executed) in terms of time, and can therefore efficiently operate.

In particular, the article producing terminal apparatus is suitable for use in a case where as an estimated time needed for article production associated with each article-producing job data at the time of displaying a list of acquired article-producing job data, a clerk or the like, for example, can select article-producing job data and execute the process thereof according to the time zone or convenience.

BRIEF DESCRIPTION OF THE DRAWINGS

FIG. 1 is an explanatory diagram of a print service system according to an embodiment of the present invention;

FIGS. 4A and 4B are explanatory diagrams respectively showing a job data base and a download job storage section according to the embodiment;

DETAILED DESCRIPTION OF THE PREFERRED EMBODIMENTS

Figure 2A:
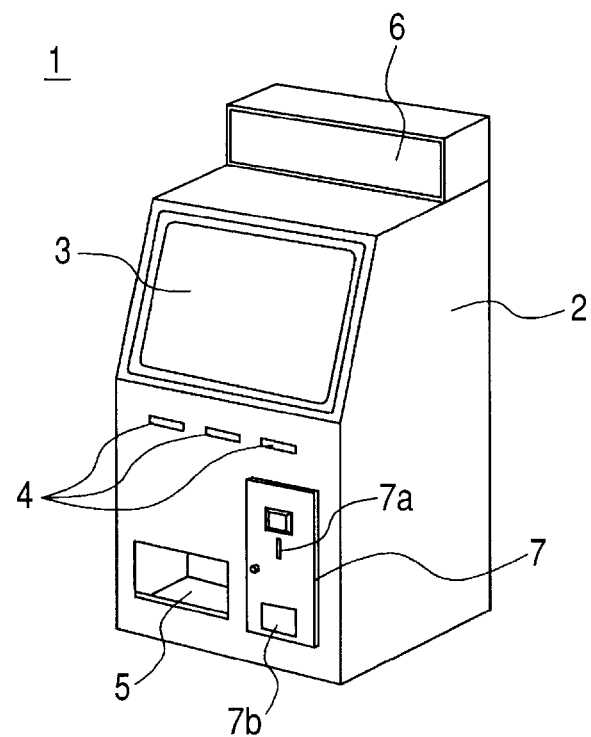
FIGS. 2A and 2B are explanatory diagrams showing appearance examples of a print terminal apparatus according to the embodiment.

An embodiment of the present invention will be described below. A print terminal apparatus will be described herein by way of example as a article producing terminal apparatus.

Referring to FIG. 1, first, a system configuration including a print terminal apparatus 1 according to the embodiment will be described.

A network 70 in FIG. 1 can be assumed to be a public network, such as the Internet. The network 70 may be a network using an exclusive line.

A client terminal 71, a job server 72, and the print terminal apparatus 1 are connected to one another in a communicatable manner over the network 70, thereby configuring a system for a print service.

The client terminal 71 is the terminal apparatus of a general user or a client who uses the print service, e.g., a personal computer located in the client's home. Although FIG. 1 shows only one client terminal 71, there are multiple client terminals 71 (the terminals of multiple service users) as terminal apparatuses communicatable over a network.

The job server 72 stores job data as an order for a print service for image data, for example, when the user transmits the order from the client terminal 71.

The print terminal apparatus 1 according to the embodiment is sited in each shop. FIG. 1 shows print terminal apparatuses 1 sited in a shop A and a shop B.

Such a print service system can execute the following operation.

When a client wants to print image data, picked up himself or herself with a digital still camera, by using the print service system, the client transmits an order for the print service from the client terminal 71. In this case, the client transmits job data as one unit of order.

Job data includes one piece or plural pieces of image data to be printed, and print production information for a process of producing the print image of each piece of image data. The print production information is information on the number of prints, the sheet size, the order date, etc. for each piece of image data. Of course, the print production information may include information which designate the image quality, image processing at the time of printing, or the like.

The job data includes terminal designation information which designates the print terminal apparatus 1 that executes a print process specified by the order, and client terminal information that identifies a client (client terminal 71) as a person who has placed the order. The terminal designation information is ID or the like of the print terminal apparatus 1 registered in the present system. The client terminal information can be a client ID if assigned to the client terminal 71 in user registration or so, or can be an e-mail address or the like.

The client selects image data to be printed at the time of placing an order from the client terminal 71, designates the number of prints, the size thereof and the like for each piece of image data as print production information, and designates a print terminal apparatus 1. The print terminal apparatus 1 to be designated is a location where the client goes to receive print images, and may be a print terminal apparatus 1, for example, in a nearby shop.

The client who wants to use a print service views a Web site which introduces and provides the print service, using the Internet browser capability of the client terminal 71. The Web site has a page prepared for transmission of job data (i.e., an order), and is designed to be able to attach image data and input print production information and terminal designation information. According to the contents of the page being viewed currently, the client can select and attach image data the client has, input print production information, and select a pickup location (input terminal designation information). After inputs are completed, the client executes a transmission operation. As a result, job data as one order is transmitted to the job server 72.

The job server 72 is constituted by, for example, a computer system, and manages the job data base.

The job server 72 registers and stores job data, transmitted from unspecified multiple client terminals 71, in a job data base, for example, as shown in FIG. 4A.

As shown in FIG. 4A, in the job data base, each job data stored is affixed with a job order number (SA001, SA002, or the like).

Terminal designation information (TD1, TD2 or the like), client terminal information (UT1, UT2 or the like), print production information and image data PCT, which are the contents transmitted as job data, are stored in the job data base.

Download lapse information DLP indicating the progress of the subsequent process is added to each job data.

With job data from unspecified multiple client terminals 71 registered in the job data base as shown in FIG. 4A, the job server 72 stands by for an access made by each print terminal apparatus 1.

The print terminal apparatus 1 accesses the job server 72, when necessary, to check the contents of the job data base. In this case, the print terminal apparatus 1 searches individual pieces of job data registered in the job data base for job data whose terminal designation information designates the local print terminal apparatus 1.

When there is job data designating the local print terminal apparatus 1, the print terminal apparatus 1 downloads the job data. Thereafter, the print terminal apparatus 1 produces print images based on the downloaded job data.

The client can go over to a shop where the designated print terminal apparatus 1 is located and receive print images as articles produced by the print terminal apparatus 1 in the shop.

The above-described operation is merely one executable example.

For example, the print terminal apparatus 1 can upload job data to the job server 72. If the print terminal apparatus 1 in a shop A is very busy and job data downloaded once or job data as an order accepted at the shop cannot be processed, the print terminal apparatus 1 adds terminal designation information designating the print terminal apparatus 1, for example, in a shop B to the job data, and uploads the resultant job data to the job server 72. In this case, the job data designating the print terminal apparatus 1 in the shop B is registered in the job data base.

Thereafter, when the print terminal apparatus 1 in the shop B searches the job data base for job data which designates this local print terminal apparatus 1 and downloads the job data, the print terminal apparatus 1 acquires the job data uploaded from the shop A in the above-described manner. Then, the print terminal apparatus 1 executes printing based on the job data.

In a case where the shop A and the shop B are a main office and a branch, respectively, or in cooperation with each other, or the print terminal apparatuses 1 are located nearby, such transfer of job data from one print terminal apparatus 1 to another print terminal apparatus 1 can ensure efficient use of each print terminal apparatus 1.

While the system configuration in FIG. 1 is provided with the job server 72, an exclusive apparatus as the job server 72 may not be provided.

For example, one print terminal apparatus 1 serves as a master terminal, and the master print terminal apparatus has a capability to serve as the job server 72 and manages the job data base. Job data from the client terminal 71 or other print terminal apparatuses 1 is transmitted to the master print terminal apparatus to be registered in the job data base therein. The master print terminal apparatus and another print terminal apparatus 1 each have only to search the job data base in the master print terminal apparatus, and download job data designating the local print terminal apparatus.

A description will now be given of the configuration of the print terminal apparatus 1 according to the embodiment which realizes the above-described operation of the print service system. While the following description is premised on that the job server 72 manages the job data base, the operation of the print terminal apparatus 1 of the embodiment which will be described below is also possible even in the above-described case where the master print terminal apparatus manages the job data base.

Figure 2B:
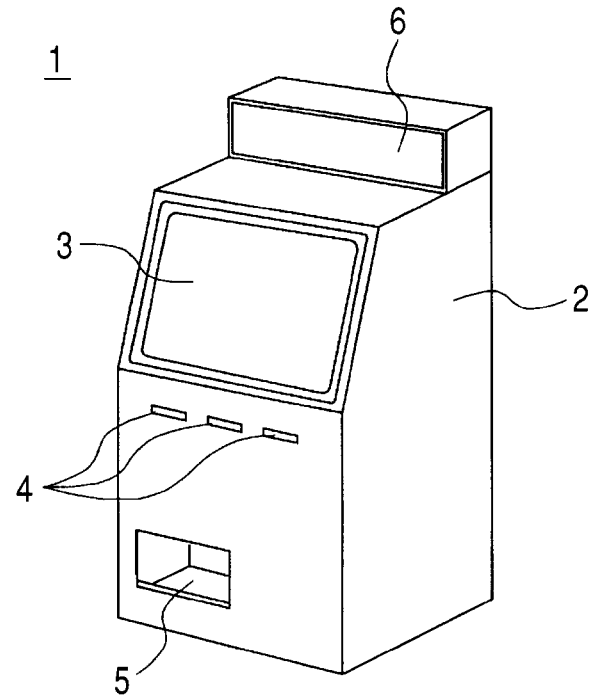

FIGS. 2A and 2B show appearance examples of the print terminal apparatus 1. It is assumed that the print terminal apparatus 1 functions as a print order terminal which is sited in a shop, such as a photograph shop or a convenient store, a theme park, a sightseeing place or any other business institution, and can be used by any general user (client). That is, the apparatus can allow a client carrying image data stored in a memory card or the like into a shop to operate the print terminal apparatus 1 on the premise to place an order, and receive print images there.

As other usages, the client can place an order in the above-described manner, and receive print images at the shop later.

As shown in FIGS. 2A and 2B, an advertisement display section 6 is disposed on the top side of a casing 2 of the print terminal apparatus 1. An LED (Light Emitting Diode) board, for example, is used as the advertisement display section 6.

A display/input unit 3 is disposed at the upper front portion of the casing 2. A touch-panel type display device, for example, is used as the display/input unit 3. The display/input unit 3 displays an operation menu, an operation guide, images to be printed, and so forth. A user performs an operation according to the displayed operation procedures. An operational input is made by the user's touching any region on the touch panel.

Instead of the touch panel, a keyboard or so having operation keys arranged as an operation unit.

Memory card slots 4 in which a memory card can be loaded are provided at the center of the casing 2. The memory card is a card-like recording medium incorporating a semiconductor memory. There are plural types of memory cards of different standards. To cope with those different types of memory cards, a plurality of memory card slots 4 according to the types are provided.

Provided at the lower portion of the casing 2 is a picture take-out port 5 where finished printed photographs are taken out.

A fee insert apparatus 7 is located at the lower front portion of the casing 2 as shown in FIG. 2A. The fee insert apparatus 7 has a coin slot 7a and a coin return port 7b. A client makes payment according to prints to be ordered through the fee insert apparatus 7.

The fee insert apparatus 7 may be a credit card settling apparatus, a prepaid card apparatus, an electronic money settling apparatus or the like.

FIG. 2B shows an example where the fee insert apparatus 7 is not provided, such as a case where a client makes payment to a clerk or a case where a free print service is provided.

Figure 3:
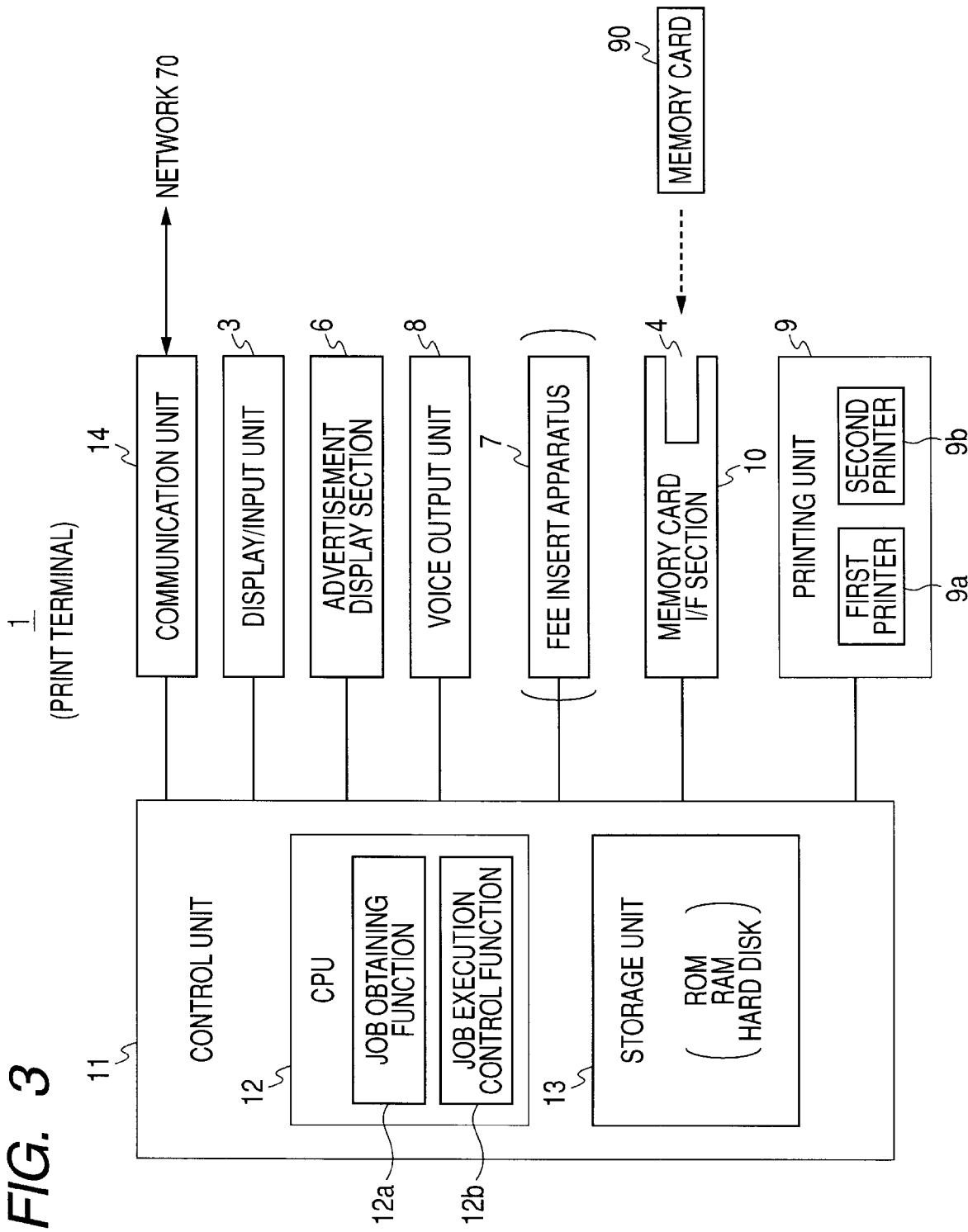
FIG. 3 is a block diagram of the print terminal apparatus according to the embodiment.

FIG. 3 shows an example of the internal configuration of the print terminal apparatus 1.

The print terminal apparatus 1 includes a control unit 11, the display/input unit 3, the advertisement display section 6, a voice output unit 8, a job server 72, the fee insert apparatus 7, a memory card interface (I/F) section 10, a printing unit 9, and a communication unit 14.

The control unit 11 controls an operation from acceptance of image data till execution of printing. The control includes displaying of various confirmation screens for a user. The control unit 11 has a CPU (Central Processing Unit) 12 and a storage unit 13 as main components.

The CPU 12 performs processing for operational control of the print terminal apparatus 1 and supply of control signals to the respective parts. The CPU 12 controls the respective parts in accordance with an operation program and an operational input to implement the following operation.

The CPU 12 has a job obtaining functional section 12a and a job execution control functional section 12b provided as software modules.

The job obtaining functional section 12a is the function that executes a process of searching the job data base in the job server 72 or the like and downloading job data whose terminal designation information designates the local print terminal apparatus 1. The job obtaining functional section 12a executes a process in FIG. 5 to be described later.

The job execution control functional section 12b controls a print operation according to an order. Specifically, the job execution control functional section 12b is the function that controls a print operation according to an order made in a shop, and a print operation based on job data downloaded by the job obtaining functional section 12a. The job execution control functional section 12b executes a process in FIG. 6 to be described later.

The storage unit 13 stores programs to achieve various processes which are executed by the CPU 12, the job obtaining functional section 12a and the job execution control functional section 12b, is used to temporarily store work data in execution, and stores image data. In the case of FIG. 3, the storage unit 13 is illustrated to include both a volatile memory and a non-volatile memory. For example, the storage unit 13 includes a non-volatile memory, such as ROM (Read Only Memory) to store a program, RAM (Random Access Memory) as an operation work area or for various temporary storages, EEP-ROM (Electrically Erasable and Programmable Read Only Memory).

The storage unit 13 is also illustrated to further include a hard disk unit. The hard disk unit is used to save image data acquired from, for example, a memory card 90 and downloaded job data.

The hard disk unit as the storage unit 13 has an area prepared as a download job storage section, as shown in FIG. 4B. As mentioned above, through the process of the job obtaining functional section 12a, the print terminal apparatus 1 accesses the job server 72 to search the job data base, and downloads job data whose terminal designation information designates the local print terminal apparatus 1. In the case of the print terminal apparatus 1 indicated by terminal designation information TD1 in FIG. 4A, for example, the print terminal apparatus 1 downloads job data with job order numbers SA001, SA003 as illustrated. The print terminal apparatus 1 stores the downloaded job data into the download job storage section in the storage unit 13 (e.g., hard disk unit) as shown in FIG. 4B.

While a job order number, client terminal information and image data, for example, for one job data are stored in the download job storage section, the time needed for a print operation based on the job data is calculated and an estimated process time is also stored in the download job storage section.

In FIG. 3, the display/input unit 3 includes a display device which displays various screens to prompt an instruction or an operation to a user, and images to be printed, and an input device which notifies the CPU 12 of an operation with respect to the touch panel. The CPU 12 executes processes of controlling the display operation of the display/input unit 3, executing various display operations to be described later, and accepting the user operation input through the touch panel of the display/input unit 3.

The advertisement display section 6 turns on and off the LED according to, for example, a predetermined pattern to display predetermined advertisement information under the control of the CPU 12.

The voice output unit 8 is an audio system which outputs voice messages and electronic sounds to give an instruction, an operation, warning or the like to the user. The voice output unit 8 includes a voice signal generator, an audio circuit, and a speaker. The CPU 12 controls the voice output unit 8 so that the voice output unit 8 executes a predetermined voice output at a predetermined timing.

The fee insert apparatus 7 executes a payment process in response to coin insertion made by the user. The fee insert apparatus 7 includes a discrimination section which discriminates a coin inserted through the coin slot 7a, a calculation section which calculates inserted money and change, a coin storage section, and a money return section which discharges change or returned money to the coin return port 7b. When a user is asked to make payment, the fee insert apparatus 7 notifies the CPU 12 of money to be inserted, and the CPU 12 checks if the proper money is inserted in the fee insert apparatus 7.

In case of the print terminal apparatus 1 in FIG. 2B, the fee insert apparatus 7 is not provided.

The memory card interface section 10 is a device which acquires image data by transferring data from the memory card 90 loaded into the memory card slot 4. The CPU 12 acquires image data from the memory card 90 the user brings in by reading image data from the memory card 90 via the memory card interface section 10. The CPU 12 stores the image data read from the memory card 90 into, for example, the hard disk unit in the storage unit 13.

The printing unit 9 includes one printing device or a plurality of printing devices to print image data on a print sheet. In the illustrated example, the printing unit 9 is configured to have two printing devices, namely a first printer 9a and a second printer 9b. A plurality of printing devices are provided to cope with, for example, a case where printers of different print systems are needed according to demanded qualities, a case of handling multifarious print sheet sizes, and a case where a plurality of printing devices are used in parallel to shorten the print time.

The CPU 12 (job execution control functional section 12b) controls execution of printing by the first printer 9a and the second printer 9b. When the first printer 9a and the second printer 9b compatible with different print sheet sizes respectively, for example, the CPU 12 selects one of the printers according to the print size designated by the user to execute printing.

Printed print images printed by the printing unit 9 are sent to the memory card slot 4 as articles to be presented to the user.

The communication unit 14 is configured as a network interface section which communicates with an external apparatus over the network 70. The print terminal apparatus 1 can perform data communication with the job server 72, another print terminal apparatus 1 and the client terminal 71 as an external apparatus via the communication unit 14.

For example, the job obtaining functional section 12a of the CPU 12 accesses the job server 72, one of external apparatuses, via the communication unit 14 to perform downloading.

The print terminal apparatus 1 according to the embodiment is configured as follows.

The individual units described in the appended claims are equivalent to the following components of the print terminal apparatus 1.

communication unit: communication unit 14
article producing unit: printing unit 9
job acquiring unit: control unit 11 (job obtaining functional section 12a)
job execution control unit: control unit 11 (job execution control functional section 12b)
operation input unit: display/input unit 3
display unit: display/input unit 3

This print terminal apparatus 1 is placed in a shop or the like, and a user or a client can use the print terminal apparatus 1 to print out image data picked up with the user's own digital still camera or the like.

As one using method, the client brings image data in the memory card 90, inserts the memory card 90 into the memory card slot 4, and input minimum information necessary for an order according to operation procedures displayed on the display. In this case, the print terminal apparatus 1 executes printing based on the number of prints, the size thereof, etc. designated by the user for all or some of images read from the memory card 90. Waiting on the premise, the client can receive print images.

As another using method, the client places an order (transmits job data) from the client terminal 71 located in a home or so. The job data is registered in the job data base in the job server 72. The print terminal apparatus 1 downloads job data designating the local print terminal apparatus 1 from the job data base, and executes a print operation based on the job data. The client can go over to the shop to receive print images later.

The operations of the print terminal apparatus 1 will be described with reference to FIGS. 5 to 9.

Figure 5:
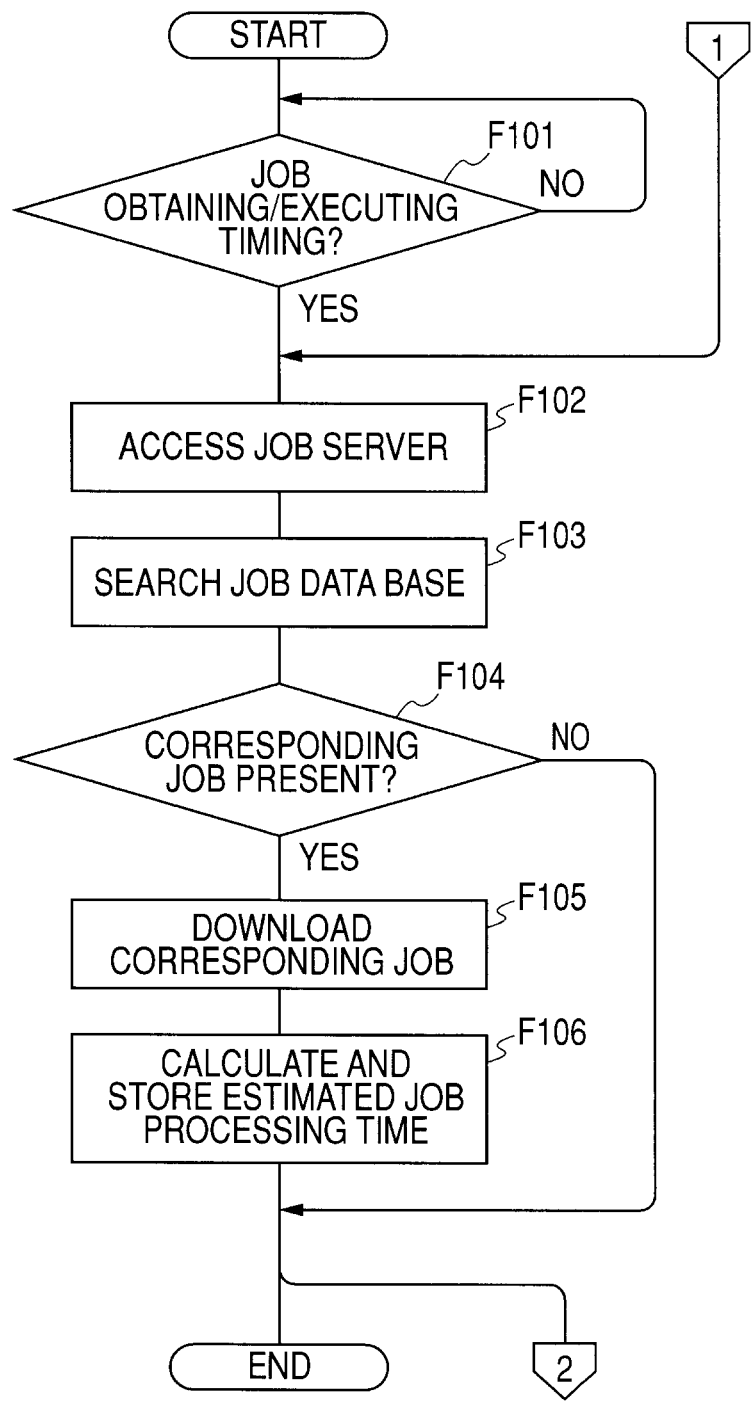
FIG. 5 is a flowchart of a job obtaining process according to the embodiment.

FIG. 5 illustrates a control process which the CPU 12 executes to obtain a job via the job obtaining functional section 12a.

The CPU 12 automatically executes the job obtaining process in FIG. 5 at a predetermined time interval.

When it is the timing to obtain a job, the CPU 12 proceeds the process from step F101 to step F102. Then, the CPU 12 accesses the job server 72 over the network 70 through the communication unit 14.

In step F103, the CPU 12 searches the job data base in the job server 72. For example, the CPU 12 transmits a search request indicating the ID of the local print terminal apparatus 1 to the job server 72, and extracts job data indicating the ID of the local print terminal apparatus 1 as terminal designation information from the job data base.

If the job data base does not contain job data indicating the ID of the local print terminal apparatus 1 as terminal designation information, the CPU 12 ends the process from step F104.

On the other hand, if the job data base contains job data indicating the ID of the local print terminal apparatus 1 as terminal designation information, the CPU 12 goes to step F105 from step F104 to download the job data. The CPU 12 stores the downloaded job data into the download job storage section in the storage unit 13 as shown in FIG. 4B.

In step F106, the CPU 12 calculates an estimated process time for the downloaded job data. The estimated process time can be roughly calculated from the number of prints, the sheet size, etc. indicated in the print production information in the job data. After calculating the estimated process time, the CPU 12 stores the estimated process time together with the job data in the download job storage section.

By executing the process as shown in FIG. 5 every given time, for example, the print terminal apparatus 1 can acquire job data job data whose terminal designation information designates the local print terminal apparatus 1, whenever needed, as job data transmitted from the client terminal 71 and registered in the job data base.

With regard to the downloaded job data, the job server 72 updates the contents of the download lapse information DLP in the job data base to "downloaded".

When "downloaded" job data is accessed in the process of FIG. 5 executed later by the print terminal apparatus 1, the job data is prevented from being extracted as a download target, so that one job data will not be downloaded to the print terminal apparatus 1 multiple times.

Although the job server 72 is accessed in step F102, when a specific print terminal apparatus 1 serving as the master print terminal apparatus manages the job data base, the master print terminal apparatus is accessed instead.

The process which the CPU 12 executes via the job execution control functional section 12b will be described referring to FIG. 6.

Figure 6:
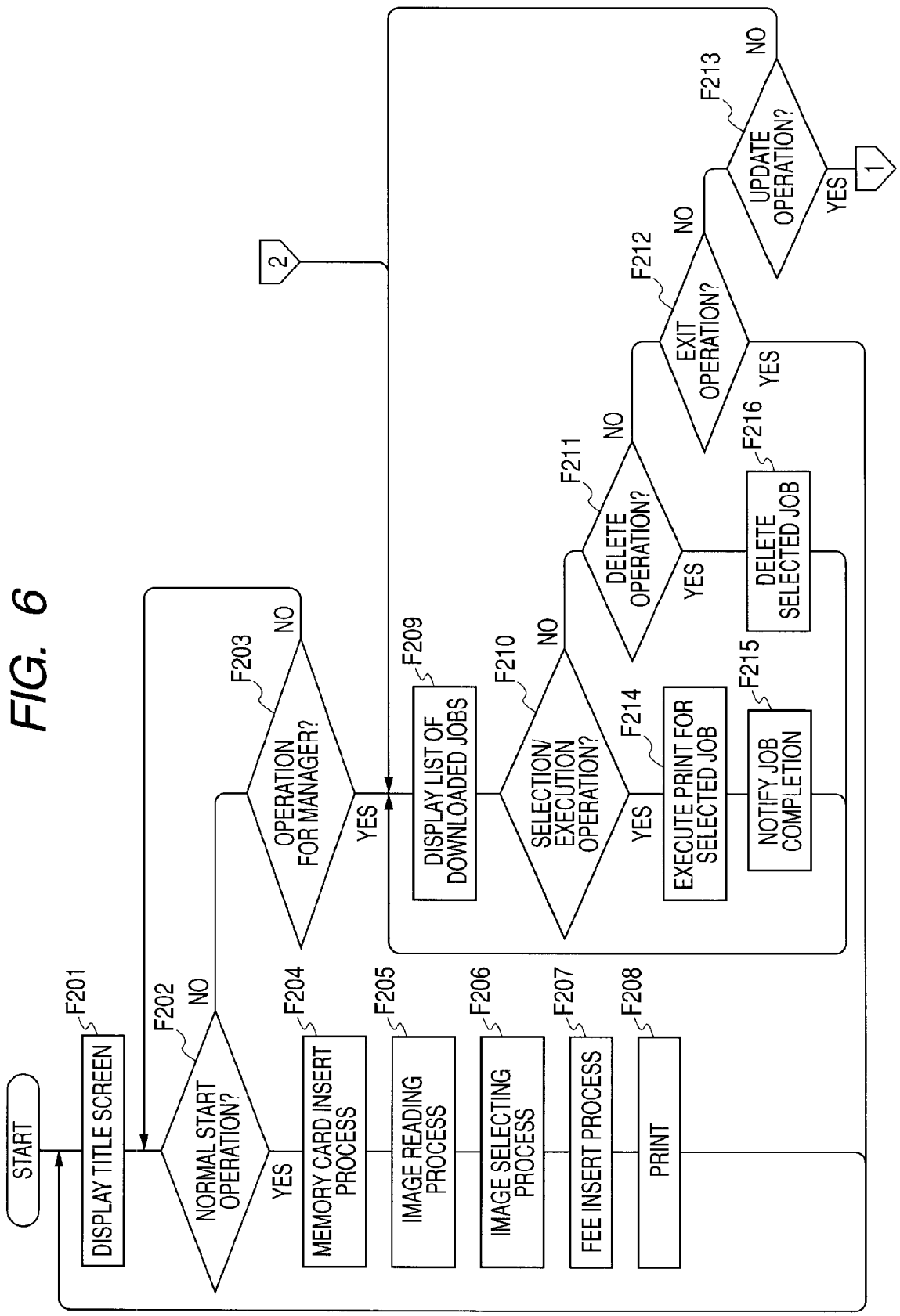
FIG. 6 is a flowchart of a job execution control process according to the embodiment.

The process in FIG. 6 copes with an order placed as a client goes over to a shop and operates the print terminal apparatus 1, and an order as job data job data downloaded in the above-described manner.

The print terminal apparatus 1 normally displays a title screen or the like for a print service on the display/input unit 3, so that viewing the screen, a user can identify that the print terminal apparatus 1 is the apparatus for the print service. In step F201, the CPU 12 controls the display/input unit 3 so as to display such a title screen.

With the title screen displayed, the CPU 12 monitors an operational input in step F202 and step F203. A general client touches on the title screen (touch operation) to start the operation. The CPU 12 detects if there is such a touch operation in step F202.

There is a management screen for allowing a manager to perform setting and management besides the normal service screen. A manager proceeds to the management screen by inputting a password or performing a specific operation. The CPU 12 detects if such an operational input for a manager is made in step F203.

When detecting an operation of touching the title screen, the CPU 12 determines that it is a normal start operation in step F202, and proceeds to step F204 to perform a process on insertion of the memory card 90 by the client. For example, the CPU 12 displays a screen as shown in FIG. 7A on the display/input unit 3.

Figure 7A:
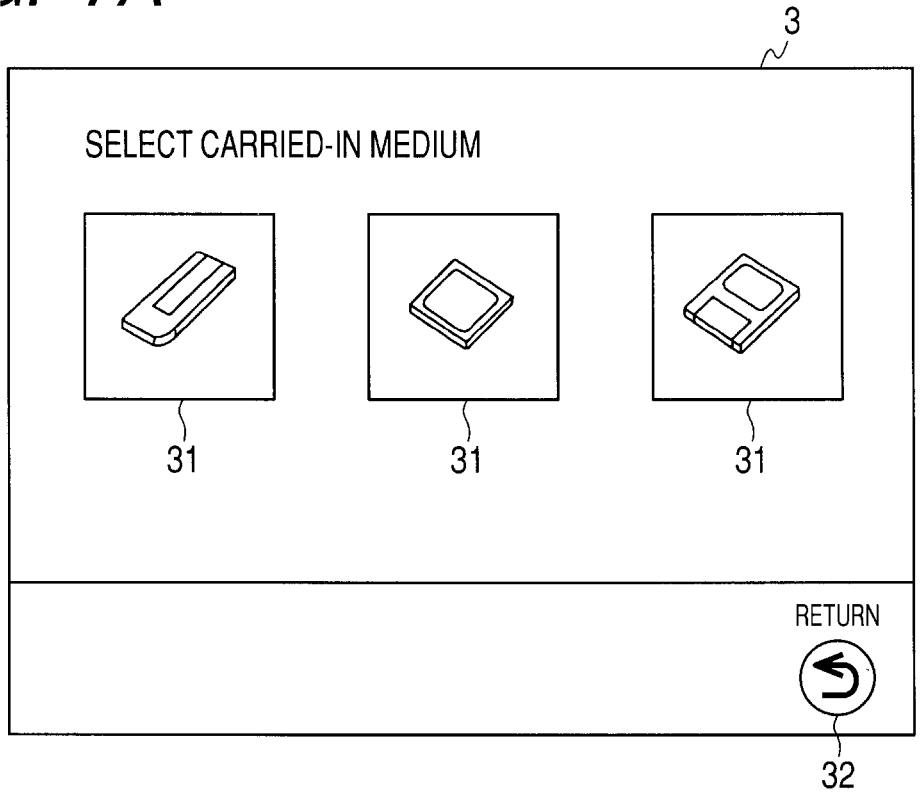
FIGS. 7A and 7B are explanatory diagrams of screen display examples according to the embodiment.

The screen of FIG. 7A allows the user to select the type of the memory card 90 the user has carried in, and displays plural types of memory cards 90 as memory card selection images 31. The screen in FIG. 7A and individual screens to be described later also show a RETURN button 32 as an operation icon to return the display to the previous screen. When the user touches the RETURN button 32, the CPU 12 returns the screen to the previous screen.

As the user touches the memory card selection image 31 on the screen in FIG. 7A which corresponds to the type of the memory card 90 the user has carried in, the CPU 12 detects the selecting operation to identify the type of the memory card 90.

Upon detection of the user's selecting operation, the CPU 12 displays a message to prompt insertion of the memory card 90 into the memory card slot 4 corresponding to the type.

When the memory card 90 is loaded into the memory card slot 4, the CPU 12 executes a process of reading image data from the loaded memory card 90. That is, the CPU 12 reads image data stored in the memory card 90 via the memory card interface section 10, and stores the image data into the hard disk unit as the storage unit 13.

While a user can bring in image data in the memory card 90 in the example, the user may bring in image data recorded on an optical disk, a flexible disk or the like, so that the print terminal apparatus 1 reads image data therefrom, or the user may transmit image data to the print terminal apparatus 1 through data communication from a cellular phone, PDA (Personal Digital Assistants) or the like. It is also possible to transmit image data through radio transmission with the IrDA (Infrared Data Association) standards, Bluetooth standards or the like.

Figure 7B:
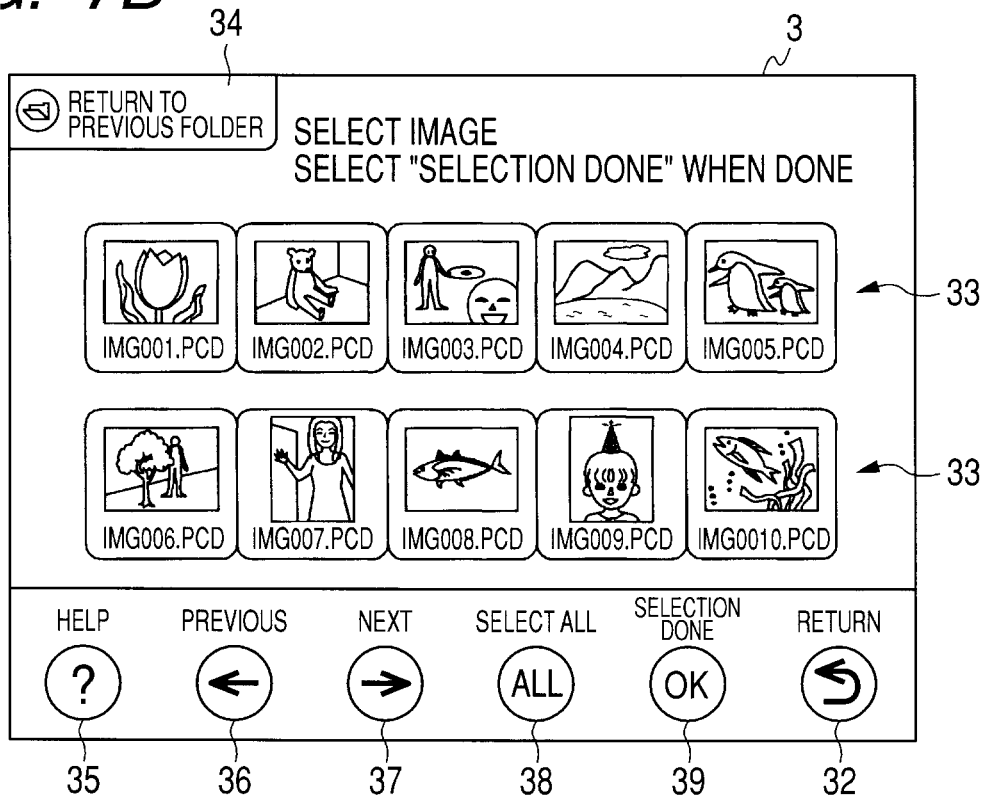

When reading of image data is completed, the CPU 12 then executes an image selecting process in step F206. The CPU 12 displays a list of the read image data as shown in, for example, FIG. 7B on the display/input unit 3. For example, a list of thumbnail images of individual read images is displayed. The screen in FIG. 7B shows thumbnail images 33 for individual pieces of image data, and operation icons, such as the RETURN button 32 to return to the previous screen, a RETURN button 34 to return to the previous folder, a HELP button 35, forward and backward page buttons 36 and 37, a SELECT ALL button 38, and a SELECTION DONE button 39. As the user touches one of various icons 32, 34, 35, 36, 37, 38 and 39, the control unit 11 executes a process of returning the screen, displaying a guide message, feeding the page forward or backward, selecting all images, or completing the selection.

The user can select an image to be printed and make setting for each image by performing a touch operation on any of the various operation icons 32, 34, 35, 36, 37, 38, 39 and the thumbnail images 33.

Figure 8:
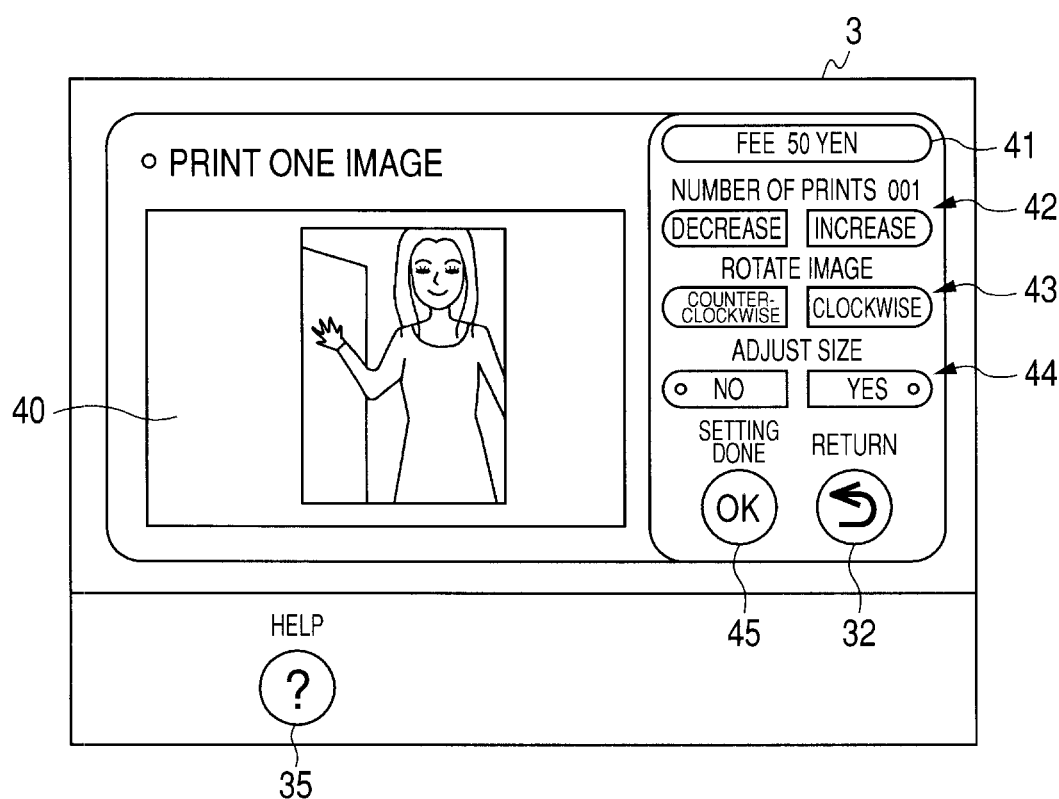
FIG. 8 is an explanatory diagram of a screen display example for image print setting according to the embodiment.

When the user touches one thumbnail image 33, for example, the control unit 11 displays a screen in FIG. 8, for example, on the display/input unit 3 as a setting screen.

The setting screen shows an enlarged display 40 of the image selected by the user, a fee display 41, a SET NUMBER OF PRINTS button 42, a ROTATION SETTING button 43, an ADJUST SIZE button 44, an END SETTING button 45, the RETURN button 32 and the HELP button 35.

Using the SET NUMBER OF PRINTS button 42, the ROTATION SETTING button 43, and the ADJUST SIZE button 44, the user can set the number of prints of the selected image, rotate the image, adjust the size of the prints.

When the user touches the END SETTING button 45, the control unit 11 settles the setting done so far by the user's operation. That is, the control unit 11 settles the setting on the selected image and returns the screen to the list display in FIG. 7B.

The user selects an image to be printed from the displayed list of the thumbnail images 33 in FIG. 7B, and decides the number of prints on the setting screen as shown in FIG. 8. The CPU 12 settles the setting on each image.

As the process in step F206, the CPU 12 provides a display for selecting an image to be printed and a display for making the setting on the selected image, and decides an image to be selected and the setting thereon in response to the user's operation. When the SELECTION DONE button 39 is touched on the screen in FIG. 7B, the CPU 12 decides that the user's selection and the user's setting operation are done, and settles the image to be printed, and the settings on the image to be printed, such as the number of prints, the rotation, and the size.

When the contents of the user's order are settled in the process of step F206, the CPU 12 executes a fee insert process in step F207. For example, the CPU 12 displays a fee according to the number of prints or the like in the contents of the order on the display/input unit 3 to prompt the user to insert the fee.

When the user inserts the necessary fee through the coin slot 7a, the fee insert apparatus 7 executes the payment process, informing the control unit 11 of the inserted fee. When the control unit 11 confirms the necessary fee inserted, the control unit 11 proceeds the process from step F207 to step F208.

In case of the print terminal apparatus 1 which is not provided with the fee insert apparatus as shown in FIG. 2B, the user pays the fee to a clerk according to the settled order contents. In this case, the clerk can perform a specific operation to cause the print terminal apparatus 1 to move to step F208.

The case where the print terminal apparatus 1 as shown in FIG. 2B can be used free is considered to be equivalent to a case where the process in step F207 in FIG. 6 is omitted.

In step F208, the CPU 12 controls execution of printing according to the order. In this case, the printing unit 9 executes printing based on the setting done in step F206, i.e., executes printing according to the number of prints and the size set of each image selected by the user.

The user can wait on the premise and receive print photographs printed. When the print process is terminated, the CPU 12 returns the screen on the display/input unit 3 to the title screen in step F201.

When a client/user comes to a shop and uses the print terminal apparatus 1, the above-described processes are executed. In an inactive time zone where clients are not present or after the shop is closed, the processes in and following step F209 may be executed based on the clerk's operation, and printing based on the downloaded job data may be performed.

When the clerk performs a specific operation for the manager, the CPU 12 moves the process to step F209 to display a list of downloaded job data on the display/input unit 3.

Figure 9:
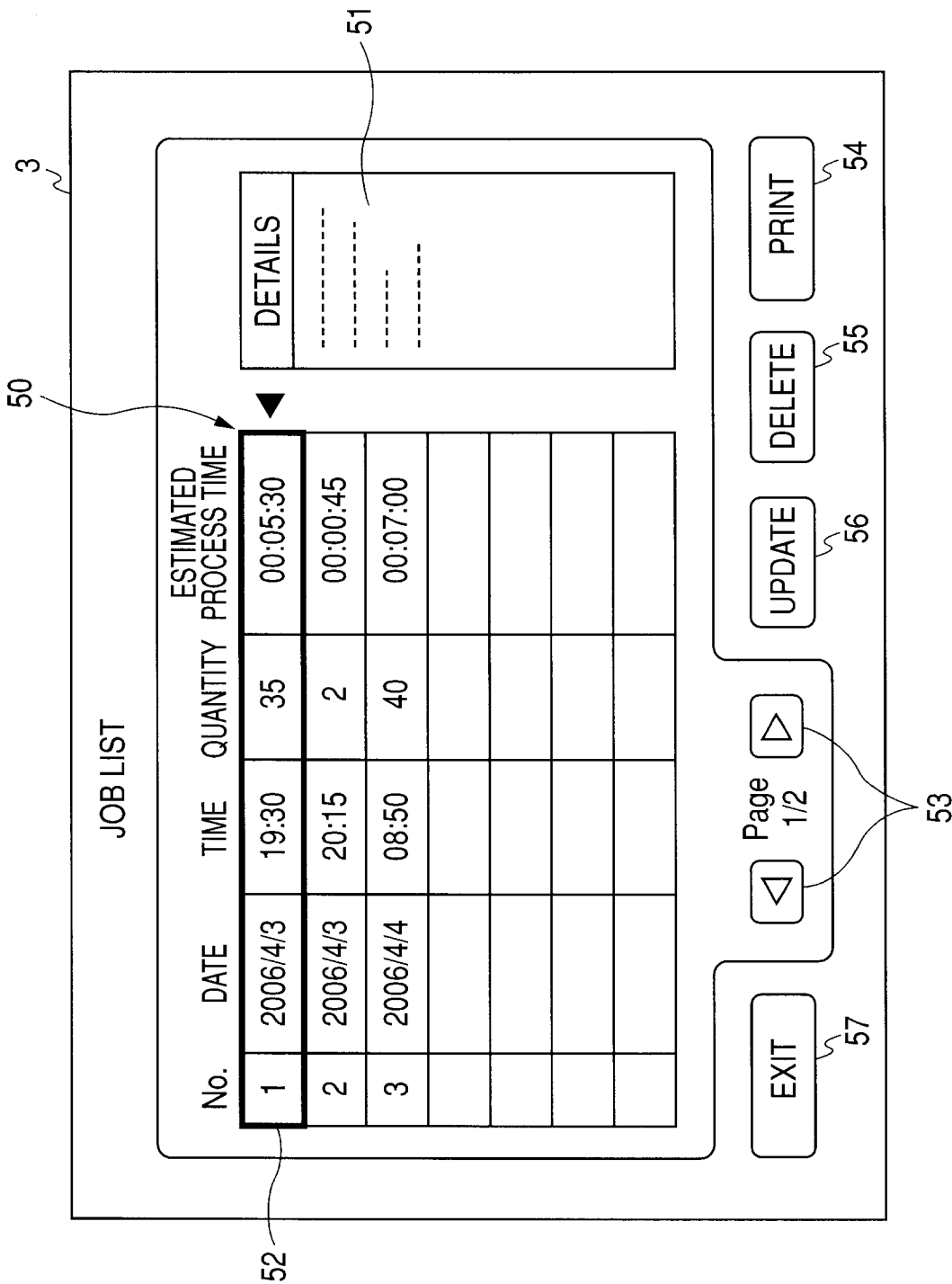
FIG. 9 is an explanatory diagram of a screen display example for a job list according to the embodiment.

This process is to display a list of job data stored in the download job storage section in the storage unit 13 as described above referring to FIG. 4B. For example, a screen as shown in FIG. 9 is displayed.

The display screen shows the contents of the downloaded job data as a job list display 50. The contents of individual pieces of job data to be listed up include date information (the date on which and time at which the user has placed an order using the terminal apparatus 1) and the number of prints (the total number of prints based on the job data) included in the print production information in the job data. The display screen also shows the estimated process time calculated in step F106 in FIG. 5.

The list of pieces of job data is displayed on with one piece of job data selected by a cursor 52 or the like (or highlighted).

With regard to the job data selected by the cursor 52, detailed contents included in the print production information in the job data, e.g., the number of pieces of image data, the number of prints of each image data, and the size thereof, are shown as a detailed display 51.

The display screen further shows MOVE PAGE buttons 53 to feed the page of displayed list forward and backward, a PRINT button 54, a DELETE button 55, an UPDATE button 56, a end (EXIT) button 57, etc.

While viewing such displays, the clerk can execute a process of printing based on job data, or deleting unnecessary job data.

When the clerk touches one of the MOVE PAGE buttons 53, the CPU 12 feeds the list page forward or backward according to the touched button. Touching job data on the list causes the CPU 12 to move the cursor 52 onto the job data or display the detailed contents of the selected job data on the detailed display 51.

The CPU 12 executes the display process according to those operations in step F209.

The CPU 12 monitors the operation of the PRINT button 54, the DELETE button 55, the EXIT button 57, and the UPDATE button 56 as the clerk's operations in steps 210, F211, F212, and F213.

When the clerk touches the PRINT button 54 with one job data selected by the cursor 52, the CPU 12 moves the process from step F210 to step F214 to control execution of printing based on the selected job data. That is, the CPU 12 supplies the printing unit 9 with individual pieces of image data for the selected job data and causes the printing unit 9 to execute printing based on the print production information.

The printed image produced by performing the print operation in this manner is stored by the clerk and provided to the client when the client comes to the shop later.

In an inactive time zone where, for example, the print terminal apparatus 1 is not intensely used, or after the shop is closed, the clerk can select job data downloaded in the above-described manner and execute printing as needed.

When production of a print image concerning one job data in the print control in step F214 is completed, the CPU 12 causes the communication unit 14 to transmit a notice of completion of the job in step F215.

The CPU 12 transmits the notice of job completion to the client terminal 71 of the client who has placed the order, based on the client terminal information included in the job data. When the client terminal information includes an e-main address, for example, the CPU 12 notifies the completion of ordered image printing by an e-mail. The notice of job completion permits the client to know the completion of image printing in the designated order, and can thereafter go over to the shop to receive the print images.

The CPU 12 also transmits the notice of job completion to the job server 72. In this case, the CPU 12 sends the job server 72 the notice of job completion specifying a job order number. The job server 72 updates the contents of the download lapse information DLP in the job data base for the job data with the job order number to "printed"

The job server 72 may delete the "printed" job data from the job data base at any time, or may hold the job data for a predetermined time since the update to "printed" and then delete the job data after the time elapses.

After transmitting the notice of job completion in step F215, the CPU 12 returns to step F209 to return the screen to the display of the job list.

When the clerk touches the DELETE button 55 with one job data selected by the cursor 52, the CPU 12 moves the process from step F211 to step F216 to perform the process of deleting the selected job data from the list. When the clerk requests cancellation of the order or when printing of job data is completed in response to the print execution operation, for example, the associated job data can be deleted from the job list.

When printing is performed in step F214, the CPU 12 may delete the job data from the job list upon completion of the printing even without the clerk's operation.

The process of deleting job data from the job list in response to an order cancellation request or upon completion of printing may be a process of adding flag information indicating deletion from the displayed list while keeping the job data itself saved in, for example, the download job storage section. This is because saving the job data itself can allow the clerk to confirm the job data later or restore the job data in the list.

Job data which has been deleted from the list may be erased from the download job storage section, for example, when a certain period elapses.

When the clerk operates the EXIT button 57, the CPU 12 moves the process from step F212 to step F201 to terminate the job list screen and set the screen back to the normal title screen. After a sequence of jobs is completed, the CPU 12 may return the process to step F201 without going through step F212 to display the title screen.

The UPDATE button 56 is used to update downloaded job data. That is, the UPDATE button 56 is used to execute acquisition of job data as shown in FIG. 5 based on the clerk's operation so that a latest list can be displayed.

When the UPDATE button 56 is touched, the CPU 12 moves the process from step F213 to step F102 in FIG. 5. The CPU 12 then executes the processes of steps F102 to F106 described above. That is, the CPU 12 searches the job data base in the job server 72 at this time for job data designating the local print terminal apparatus 1, and downloads the job data, if present, as the latest state.

In this case, after the process of step F104 or step F106, the CPU 12 returns to step F209 in FIG. 6. That is, a list of job data in the latest state is displayed.

Although the configuration and the operation of the print terminal apparatus 1 according to the embodiment have been explained above, the print terminal apparatus 1 can allow a client to use the print service by making an order for image printing to the print terminal apparatus 1 in a shop, or placing such an order by transmitting job data from the client terminal 71 and going over to the shop where the print terminal apparatus 1 is sited later to receive print images. Therefore, a person who orders printing of a lot of prints need not wait for a long time in front of the print terminal apparatus 1 until the printing is done as long as a print order is made.

The print terminal apparatus 1 can operate efficiently.

The print terminal apparatus 1 accesses the job server 72 as an external apparatus to search for job data designating the local print terminal apparatus 1, and acquire the job data. After acquiring the job data, for example, the print terminal apparatus 1 displays a list of job data in step F209, and execute the print process based on the job data selected in the list according to the clerk's operation.

While the print terminal apparatus 1 normally executes printing based on the operation by a client who has visited a shop, the print terminal apparatus 1 can collect orders directed to the print terminal apparatus 1 and placed by clients who do not come to the shop to perform the operation, one after another, and can execute operations according to the orders in response to a clerk's operation, in an inactive time zone where there are few customers or after the shop is closed or so. This can ensure that the article producing terminal apparatus can perform flexible and efficient operation with respect to orders (jobs to be executed).

Even a print terminal apparatus 1 whose occupancy rate is low, e.g., a print terminal apparatus 1 which is sited at a place or in a shop which is not crowded so much, can increase its operating rate by executing print jobs coming from individual clients.

Further, in a case where a vast amount of job data is concentrated on one print terminal apparatus 1, if job data which cannot be dealt with the print terminal apparatus 1 is uploaded to another print terminal apparatus 1 with designating another print terminal apparatus, the intensive pieces of job data can be distributed to a plurality of print terminal apparatuses 1 to achieve efficient printing.

As the print terminal apparatus 1 accepts job data transmitted from clients over the network 70 such as the Internet, setting links from multiple locations can allow a single print terminal apparatus 1 to be noticed by a greater number of people than can normally noticed by clients visiting a shop or so, thereby encouraging the use of the print service.

As the module (job obtaining functional section 12a) which downloads job data from the job server (job data base) and the module (job execution control functional section 12b) which executes a process based on the operation by a client or the downloaded job data are separated from each other, downloading by the job obtaining functional section 12a is possible as a background process during the normal print operation or the control process of the job execution control functional section 12b. That is, even if the capacity of the communication lines of the network 70 is low and downloading of image data takes time, the normal process by the job execution control functional section 12b, i.e., the print process based on the operation by a client who has come to a shop can be executed.

Because printing based on downloaded job data is carried out later in response to an operation by a clerk, the service to clients will not be reduced even if downloading of image data takes time.

Further, a clerk can confirm the number of orders unprocessed and estimated process times for the orders on the job list screen as shown in FIG. 9. Therefore, the print terminal apparatus 1 is suitable for a case where a clerk or the like selects job data and executes printing according to the business time zone or the convenience of the shop.

When printing based on job data is completed, a notice of job completion is transmitted. Accordingly, a person who has placed an order from the client terminal 71 in a home or so can find out the completion of the job even in a home or so.

The use of such a system is suitable for a case where, for example, a client wants to send pictures to an acquaintance living at a remote place. When a client living in Tokyo wants to send print images to an acquaintance living in Osaka, for example, the client needs to designate the print terminal apparatus 1 in a shop located near the home of the acquaintance living in Osaka at the time of transmitting job data from the client terminal 71. Then, the acquaintance can go to the nearly shop to receive the print images.

The configuration of the print terminal apparatus 1 and the process procedures are not limited to those of the example explained above, various modification may be made.

For example, printing of downloaded job data may be automatically executed without involving an operation by a clerk or so. For example, the time after closing a shop is set as an automatic printing time, so that when the set time comes, printing of downloaded job data is automatically executed.

Although job data order by the client terminal 71 is temporarily stored in the job data base in the embodiment, there may be an example where the job data base is not used.

For example, each client terminal 71 stores job data. Each print terminal apparatus 1 sequentially accesses individual client terminals 71 to search for job data whose terminal designation information designates the local print terminal apparatus 1. If corresponding job data is present, the print terminal apparatus 1 downloads the job data from the associated client terminal 71.

For example, each print terminal apparatus 1 can perform such an operation which does not use the job data base by cyclically accessing client terminals 71 of clients who have registered to use the service system.

Alternatively, such an operation may be achieved as each shop accesses client terminals 71 of specific clients, such as good customers.

Likewise, the operation of transferring job data from one print terminal apparatus 1 to another print terminal apparatus 1 can be executed without using the job data base. When one print terminal apparatus 1 has job data to be transferred to another print terminal apparatus 1, this one print terminal apparatus 1 stores the job data with designating this another print terminal apparatus las terminal designation information.

Each print terminal apparatus 1 cyclically accesses other print terminal apparatuses 1 and downloads job data designating the local print terminal apparatus 1 as terminal designation information, if present in any of the accessed print terminal apparatuses 1.

Although the article producing terminal apparatus according to the embodiment of the present invention has been explained as the print terminal apparatus 1 in the foregoing description, the invention can be adapted to other various article producing terminal apparatuses.

Figure 10:
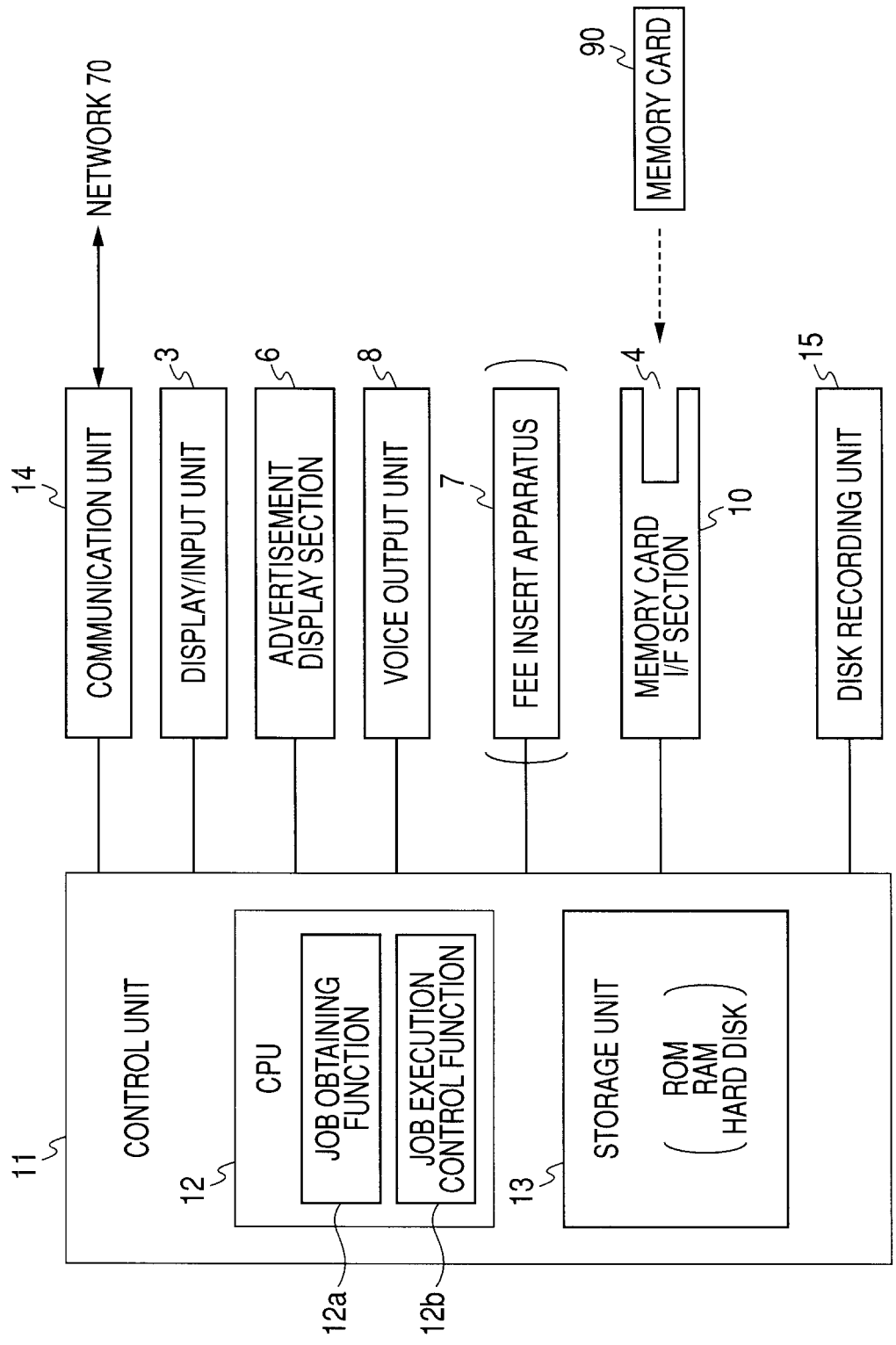
FIG. 10 is a block diagram of a disk recording terminal apparatus according to another embodiment of the present invention.

FIG. 10 shows a disk recording terminal apparatus 70 according to another embodiment of the present invention.

The disk recording terminal apparatus 70 records image data brought in the form of the memory card 90 by a user on a write once type disk, a rewritable disk or the like as an optical disk of a CD type, a DVD type or so, and provides a client with the optical disk. The disk recording terminal apparatus 80 writes data on the optical disk based on job data as an order transmitted from the client terminal 71.

The apparatus configuration shown in FIG. 10 is approximately similar to the one shown in FIG. 3, and like or same reference symbols are given to those components which are similar to or the same as the components shown in FIG. 3 to avoid redundant descriptions. In this embodiment, a disk recording unit 15 is provided in place of the printing unit 9 in FIG. 3. The disk recording unit 15 has multiple unrecorded optical disks in stock, and executes an operation of recording image data on the optical disks in accordance with an instruction from the CPU 12.

The CPU 12 has only to perform the process which is executed by the job obtaining functional section 12a as shown in FIG. 5 and the process which is executed by the job execution control functional section 12b as shown in FIG. 6. Steps F208 and F214 in FIG. 6 should be a process of controlling execution of writing data on an optical disk, not execution of printing.

The same or similar advantages of the print terminal apparatus 1 can also be obtained in the case of the disk recording terminal apparatus 70 which produces such an optical disk as an article.

A program according to an embodiment of the present invention can be realized as a program which allows the CPU 12 in the article producing terminal apparatus as the print terminal apparatus 1 or the disk recording terminal apparatus 70 to execute the processes as shown in FIG. 5 and FIG. 6.

Such a program can be prerecorded in a recording medium in an information processing apparatus like a computer system, such as a system HDD or ROM in a microcomputer having a CPU.

The program can also be temporarily or permanently stored (recorded) in a removable recording medium, such as a flexible disk, CD-ROM (Compact Disc Read Only Memory), MO (Magnet optical) disk, DVD (Digital Versatile Disc), magnetic disk or semiconductor memory. Such a removable recording medium can be provided as so-called package software. For example, the program if provided by a CD-ROM, DVD-ROM or the like can be installed into a computer system.

The program can be downloaded from a download site over a network like the LAN (Local Area Network) and the Internet as well as downloaded from a removable recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An article producing system comprising:
a plurality of terminal units connected to a network;
a plurality of external apparatuses that are connected to the network, each external apparatus having a unique identifier and holding article-producing job data received from at least one of the plurality of terminal units, the article-producing job data including image data and production information for producing an article using the image data;
a plurality of article producing units respectively connected to the external apparatuses, each of which is configured to produce the article using the article-producing job data; and
a job acquiring unit which acquires the article-producing job data from one of the plurality of terminal units via the network,
wherein,
the article-producing job data includes an identifier of the external apparatus assigned to produce the article,
each external apparatus extracts article producing job data associated with the external apparatus' unique identifier and determines the time required to produce the article,
the article producing job data and the time required to produce the article are stored in a same storage section of the corresponding external apparatus,
each external apparatus reassigns the article-producing job data in the job acquiring unit to another external apparatus when the workload of the article producing units attached to the external apparatus cannot produce the article in the required time and transmits the article-producing job data to one of the article producing units based on the work load and the physical location of each of the article producing units,
each external apparatus includes a display unit and an operation input unit, and
each external apparatus displays a list of article-producing job data acquired by the external apparatus and causes the article producing unit to execute article production for a selected article-producing job data according to an operational input from the operation input unit.

2. The article producing system according to claim 1, wherein the article producing unit is a printing unit which prints image data, and produces a printed image as the article using the image data.

3. The article producing system according to claim 1, wherein the external apparatus displays an estimated time needed for article production for each article-producing job data at a time of displaying the list of article-producing job data.

4. The article producing system according to claim 1, wherein when article production for a piece of article-producing job data in the article producing unit is completed, the external apparatus transmits a notice of completion to the terminal unit originating the application job data via the network.

* * * * *